United States Patent
Cui et al.

(10) Patent No.: US 10,820,308 B2
(45) Date of Patent: Oct. 27, 2020

(54) BASE STATION DEVICE, TERMINAL DEVICE AND COMMUNICATIONS SYSTEM

(71) Applicant: SONY CORPORATION, Tokyo (JP)

(72) Inventors: Qimei Cui, Beijing (CN); Jiang Han, Beijing (CN); Liang Zeng, Beijing (CN); Yingni Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 247 days.

(21) Appl. No.: 14/430,064

(22) PCT Filed: Aug. 15, 2013

(86) PCT No.: PCT/CN2013/081542
§ 371 (c)(1),
(2) Date: Mar. 20, 2015

(87) PCT Pub. No.: WO2014/048184
PCT Pub. Date: Apr. 3, 2014

(65) Prior Publication Data
US 2015/0282128 A1    Oct. 1, 2015

(30) Foreign Application Priority Data

Sep. 29, 2012   (CN) .......................... 2012 1 0376253

(51) Int. Cl.
*H04W 72/04*    (2009.01)
*H04W 16/14*    (2009.01)
(Continued)

(52) U.S. Cl.
CPC ......... *H04W 72/042* (2013.01); *H04L 5/0053* (2013.01); *H04L 5/0094* (2013.01);
(Continued)

(58) Field of Classification Search
CPC ..... H04L 27/26; H04L 5/0023; H04L 5/0048; H04L 5/0053; H04L 5/0094; H04W 16/14;
(Continued)

(56) References Cited

U.S. PATENT DOCUMENTS

2010/0061401 A1*   3/2010   Nakahira ............... H04L 47/829
                                                                370/468
2010/0086064 A1    4/2010   Jianming et al.
(Continued)

FOREIGN PATENT DOCUMENTS

CN           101714962         5/2010
WO          2012 109542        8/2012
WO       WO-2014016672 A1 *    1/2014   ........... H04L 5/0053

OTHER PUBLICATIONS

International Search Report dated Nov. 21, 2013 in PCT/CN13/081542 Filed Aug. 15, 2013.
(Continued)

*Primary Examiner* — Jason E Mattis
*Assistant Examiner* — Nizam U Ahmed
(74) *Attorney, Agent, or Firm* — Xsensus LLP

(57) ABSTRACT

A communications system includes a base station device and a terminal device. The base station device configures an enhanced Physical Downlink Control Channel (ePDCCH), comprising: circuitry, configured to determine ePDCCH position indication information adapted to indicate a position of the ePDCCH in a terminal device search space based on configuration of Demodulation Reference Signal, wherein ePDCCH comprises control information of the terminal device and is aggregated by a number of enhanced control channel elements, each enhanced control channel element consisting of a set of resource elements; and gen-
(Continued)

erate a signaling comprising the ePDCCH position indication information for the terminal device.

21 Claims, 12 Drawing Sheets

(51) Int. Cl.
*H04L 5/00* (2006.01)
*H04L 27/26* (2006.01)
*H04W 88/02* (2009.01)
*H04W 88/08* (2009.01)

(52) U.S. Cl.
CPC ............ *H04L 27/26* (2013.01); *H04W 16/14* (2013.01); *H04W 72/0446* (2013.01); *H04L 5/0023* (2013.01); *H04L 5/0048* (2013.01); *H04W 88/02* (2013.01); *H04W 88/08* (2013.01)

(58) Field of Classification Search
CPC ........... H04W 72/042; H04W 72/0446; H04W 88/02; H04W 88/08
USPC ........................................................ 370/329
See application file for complete search history.

(56) References Cited

U.S. PATENT DOCUMENTS

| | | | |
|---|---|---|---|
| 2010/0195566 A1* | 8/2010 | Krishnamurthy | H04L 5/0007 370/328 |
| 2013/0064216 A1* | 3/2013 | Gao | H04L 5/0016 370/330 |
| 2013/0242885 A1* | 9/2013 | Zhu | H04W 52/0206 370/329 |
| 2013/0242890 A1* | 9/2013 | He | H04W 52/243 370/329 |
| 2013/0301542 A1* | 11/2013 | Krishnamurthy | H04W 52/50 370/329 |

OTHER PUBLICATIONS

"Consideration on DCI mapping for EPDCCH", LG Electronics, 3GPP TSG RAN WG1 Meeting #70, R1-123526, (7 Pages), Aug. 2012.

* cited by examiner

PRB-Pair-A
localized mapping

Distributed mapping where information of 4 terminal devices is carried in an additional signaling space

BASE STATION DEVICE, TERMINAL DEVICE AND COMMUNICATIONS SYSTEM

FIELD OF THE INVENTION

The present invention generally relates to the field of wireless communications and particularly to a base station device and method for configuring an enhanced Physical Downlink Control Channel (ePDCCH), a terminal device and method for detecting an ePDCCH, and a communication system, in the Long Term Evolution-Advanced (LTE-A) of a Universal Mobile Telecommunications System (UMTS).

BACKGROUND OF THE INVENTION

The Long Term Evolution (LTE) of a Universal Mobile Telecommunications System (UMTS) system has been the grandest new technology research and development project initiated by the $3^{rd}$ Generation Partnership Project (3GPP) in recent years, and this technology may be regarded as a "pseudo-4G technology". The LTE-Advanced (LTE-A) is advanced evolution of the LTE, and the report on technical demands of the LTE-A was published by the 3GPP in 2008 in which the lowest demands of the LTE-A were defined as a downlink peak rate of 1 Gbps and an uplink peak rate of 500 Mbps together with uplink and downlink peak spectrum utilization rates of up to 15 Mbps/Hz and 30 Mbps/Hz respectively. In order to satisfy a great variety of demand indexes of the 4G technology, several key technologies including carrier aggregation, coordinated multi-point transmission and reception, multi-antenna enhancement, etc., have been proposed by the 3GPP for the LTE-A.

Downlink Control Information (DCI) including resource allocation information and other control information on one or more terminal devices is carried in a Physical Downlink Control Channel (PDCCH). In the LTE, both uplink and downlink resource scheduling information is carried by a PDCCH. Generally there may be multiple PDCCHs in a sub-frame. A terminal device needs to firstly demodulate DCI in a PDCCH and then can demodulate a Physical Downlink Shared Channel (PDSCH) specific to the terminal device at a corresponding resource position, where the PDSCH includes a broadcast message, paging, data of the terminal device, etc.

At present, for scheduling demands of the key technologies, including carrier aggregation, coordinated multi-point transmission and reception, multi-antenna enhancement, etc., in the releases later than the LTE-R10, an enhanced PDCCH (ePDCCH) has been proposed in the 3GPP standardization to extend a capacity of control information and to enable a support of beam-forming, diversity, inter-cell interference cancellation and other technologies. Due to more and more supported formats of the ePDCCH, the number of times that blind detection is performed at the terminal device side has grown from 44 in the earlier releases (the Re1.8/Re1.9) to 60 in the current release (the Re.10) and is expected to further grow in future releases. In the design of the PDCCH, the terminal device is ignorant of the position at which the PDCCH thereof is placed but has to perform blind detection throughout a search space, and in the design of the PDCCH, there are absent a large number of regular blank Resource Elements (REs), so they can not be signaled. In view of this, there may be high complexity of calculation at the terminal device side in the prior art.

SUMMARY OF THE INVENTION

As compared with the PDCCH in the prior art, in the design of the ePDCCH, there are a considerable number of regular blank resource elements in the majority of system configuration. Based on this, the invention provides a method for configuring an enhanced Physical Downlink Control Channel (ePDCCH), and in this method, blank resource elements in the ePDCCH can be made full use by adding new signaling to the blank resource elements to thereby lower the number of times that blind detection is performed at the terminal device side and consequentially the complexity of calculation at the terminal device side.

According to an embodiment of the invention, there is provided an base station device adapted to configure an enhanced Physical Downlink Control Channel (ePDCCH), the base station device including: circuitry, configured to determine ePDCCH position indication information adapted to indicate a position of the ePDCCH in a terminal device search space based on configuration of Demodulation Reference Signal, wherein ePDCCH comprises control information of the terminal device and is aggregated by a number of enhanced control channel elements, each enhanced control channel element consisting of a set of resource elements; and generate a signaling comprising the ePDCCH position indication information for the terminal device.

Further to the base station device above, the ePDCCH position indication information includes a start position of the ePDCCH in the terminal device search space which is determined based on an aggregation level of the terminal device search space.

Further to the base station device above, the aggregation level is an integer multiple of the number of enhanced Control Channel Elements (eCCEs) contained in the physical resource block pair (PRB-pair).

Further to the base station device above, the ePDCCH position indication information further includes an offset of the ePDCCH in the terminal device search space.

Further to the base station device above, the circuitry is further configured to determine blank resource elements unused in a physical resource block pair (PRB-pair) and carry the ePDCCH position indication information onto the blank resource elements so as to obtain a sub-frame that contains the signaling carrying the ePDCCH position indication information.

Further to the base station device above, the circuitry, according to the number of the blank resource elements, either places the signaling into one or more continuous physical resource block pairs (PRB-pairs) in a localized mapping manner, or places the signaling into a plurality of physical resource block pairs (PRB-pairs) in a distributed mapping manner.

Further to the base station device above, the circuitry adopts different lengths of bit codes for the signaling according to the number of the blank resource elements.

Further to the base station device above, the circuitry performs mapping between the terminal device and the physical resource block pair (PRB-pair), according to terminal device identifier information, in any one of the following mapping manners: one terminal device corresponds to one physical resource block pair (PRB-pair), one terminal device corresponds to a plurality of physical resource block pairs (PRB-pairs), a plurality of terminal devices correspond to one physical resource block pair (PRB-pair), or a plurality of terminal devices correspond to a plurality of physical resource block pairs (PRB-pairs).

Further to the base station device above, the circuitry is further configured to determine the ePDCCH position indication information based on system configuration information of the communication system including: the number of OFDM symbols carried in a Physical Downlink Control Channel (PDCCH) and the number of ports of a common reference signal.

According to another embodiment of the invention, there is provided a method for configuring an enhanced Physical Downlink Control Channel (ePDCCH), the method including: determining ePDCCH position indication information adapted to indicate a position of the ePDCCH in a terminal device search space based on configuration of Demodulation Reference Signal, wherein ePDCCH comprises control information of the terminal device and is aggregated by a number of enhanced control channel elements, each enhanced control channel element consisting of a set of resource elements; and generating a signaling comprising the ePDCCH position indication information for the terminal device.

Further to the method for configuring an ePDCCH above, the ePDCCH position indication information includes an aggregation level of the terminal device search space, and a start position of the ePDCCH in the terminal device search space is determined according to the aggregation level of the terminal device search space and the terminal device identifier information.

Further to the method for configuring an ePDCCH above, the aggregation level is an integer multiple of the number of Enhanced Control Channel Elements (eCCEs) contained in the physical resource block pair (PRB-pair).

Further to the method for configuring an ePDCCH above, the ePDCCH position indication information further includes an offset of the ePDCCH in the terminal device search space.

Further to the method for configuring an ePDCCH above, the carrying step, according to the number of the blank resource elements, either places the additional signaling into one or more continuous physical resource block pairs (PRB-pairs) in a localized mapping manner, or places the additional signaling into a plurality of physical resource block pairs (PRB-pairs) in a distributed mapping manner.

Further to the method for configuring an ePDCCH above, the carrying step adopts different lengths of bit codes for the additional signaling according to the number of the blank resource elements.

Further to the method for configuring an ePDCCH above, the carrying step performs mapping between the terminal device and the physical resource block pair (PRB-pair), according to the terminal device identifier information, in any one of the following mapping manners: one terminal device corresponds to one physical resource block pair (PRB-pair), one terminal device corresponds to a plurality of physical resource block pairs (PRB-pairs), a plurality of terminal devices correspond to one physical resource block pair (PRB-pair), or a plurality of terminal devices correspond to a plurality of physical resource block pairs (PRB-pairs).

Further to the method for configuring an ePDCCH above, when a plurality of terminal devices are mapped into the same physical resource block pair (PRB-pair), scrambling is performed using the terminal device identifier information so as to distinguish, in the same physical resource block pair (PRB-pair), ePDCCH position indication information of the different terminal devices.

Further to the method for configuring an ePDCCH above, the system configuration information of the communication system includes: the number of OFDM symbols carried in a Physical Downlink Control Channel (PDCCH) and the number of ports of a common reference signal.

According to still another embodiment of the invention, there is provided a terminal device of detecting an enhanced Physical Downlink Control Channel (ePDCCH), the terminal device including: circuitry configured to determine a signaling, from an base station device, that contains ePDCCH position indication information indicating a position of the ePDCCH in a search space of the terminal device; and detect the ePDCCH in the search space based on the ePDCCH position indication information, wherein the ePDCCH position indication information is determined based on configuration of Demodulation Reference Signal by the base station device, and the ePDCCH comprises control information of the terminal device and is aggregated by a number of enhanced control channel elements, each enhanced control channel element consisting of a set of resource elements.

With the terminal device above, the ePDCCH position indication information includes a start position of the ePDCCH in the terminal device search space which is determined based on an aggregation level of the terminal device search space.

With the terminal device above, the aggregation level is an integer multiple of the number of Enhanced Control Channel Elements (eCCEs) contained in the physical resource block pair (PRB-pair).

With the terminal device above, the ePDCCH position indication information further includes an offset of the ePDCCH in the terminal device search space.

With the terminal device above, the circuitry determines, according to terminal device identifier information, the physical resource block pair (PRB-pair) in which the ePDCCH position indication information is placed.

With the terminal device above, when ePDCCH position indication information of a plurality of terminal devices exists in the same physical resource block pair (PRB-pair), descrambling is performed using the terminal device identifier information and a CRC check is performed, so as to distinguish, in the same physical resource block pair (PRB-pair), the ePDCCH position indication information of the different terminal devices.

According to a further embodiment of the invention, there is provided a method for detecting an enhanced Physical Downlink Control Channel (ePDCCH), the method including: determining a signaling, from a base station device, that contains ePDCCH position indication information indicating a position of the ePDCCH in a search space of the terminal device; and detecting the ePDCCH in the search space based on the ePDCCH position indication information, wherein the ePDCCH position indication information is determined based on configuration of Demodulation Reference Signal by the base station device, and the ePDCCH comprises control information of the terminal device and is aggregated by a number of enhanced control channel elements, each enhanced control channel element consisting of a set of resource elements.

With the method for detecting an ePDCCH, the ePDCCH position indication information includes an aggregation level of the terminal device search space, and a start position of the ePDCCH in the terminal device search space is determined according to the aggregation level of the terminal device search space and the terminal device identifier information.

With the method for detecting an ePDCCH, the aggregation level is an integer multiple of the number of Enhanced Control Channel Elements (eCCEs) contained in the physical resource block pair (PRB-pair).

With the method for detecting an ePDCCH, the ePDCCH position indication information further includes an offset of the ePDCCH in the terminal device search space.

With the method for detecting an ePDCCH, the demodulating step further includes: determining, according to the terminal device identifier information, the physical resource block pair (PRB-pair) in which the ePDCCH position indication information is placed.

With the method for detecting an ePDCCH, when ePDCCH position indication information of a plurality of terminal devices exists in the same physical resource block pair (PRB-pair), descrambling is performed using the terminal device identifier information and a CRC check is performed, so as to distinguish, in the same physical resource block pair (PRB-pair), the ePDCCH position indication information of the different terminal devices.

According to a further embodiment of the invention, there is provided a communication system, the system including: an base station device, including: circuitry, configured to determine ePDCCH position indication information adapted to indicate a position of the ePDCCH in a terminal device search space based on configuration of Demodulation Reference Signal, wherein ePDCCH comprises control information of the terminal device and is aggregated by a number of enhanced control channel elements, each enhanced control channel element consisting of a set of resource elements, and generate a signaling comprising the ePDCCH position indication information for the terminal device; and the terminal device, including: circuitry configured to determine the signaling, from the base station device, that contains the ePDCCH position indication information, and detect the ePDCCH in the search space based on the ePDCCH position indication information.

According to a further embodiment of the invention, there is provided a non-transitory computer readable medium having instructions stored therein that when executed by processing circuitry perform a method for configuring an Enhanced Physical Downlink Control Channel (ePDCCH), comprising: determining ePDCCH position indication information adapted to indicate a position of the ePDCCH in a terminal device search space based on configuration of Demodulation Reference Signal, wherein ePDCCH comprises control information of the terminal device and is aggregated by a number of enhanced control channel elements, each enhanced control channel element consisting of a set of resource elements; and generating a signaling comprising the ePDCCH position indication information for the terminal device.

According to a further embodiment of the invention, there is provided a non-transitory computer readable medium having instructions stored therein that when executed by processing circuitry perform a method for detecting an Enhanced Physical Downlink Control Channel (ePDCCH), comprising: determining a signaling, from a base station device, that contains ePDCCH position indication information indicating a position of the ePDCCH in a search space of the terminal device; and detecting the ePDCCH in the search space based on the ePDCCH position indication information, wherein the ePDCCH position indication information is determined based on configuration of Demodulation Reference Signal by the base station device, and the ePDCCH comprises control information of the terminal device and is aggregated by a number of enhanced control channel elements, each enhanced control channel element consisting of a set of resource elements.

With the invention, the number of times that blind detection is performed at the terminal device side can be lowered to thereby lower the complexity of calculation at the terminal device side.

BRIEF DESCRIPTION OF THE DRAWINGS

The above and other objects, features and advantages of the invention will become more apparent from the following description of the embodiments of the invention with reference to the drawings throughout which like or corresponding technical features or components will be denoted by like or corresponding reference numerals. In the drawings.

DETAILED DESCRIPTION OF THE INVENTION

Figure 1:
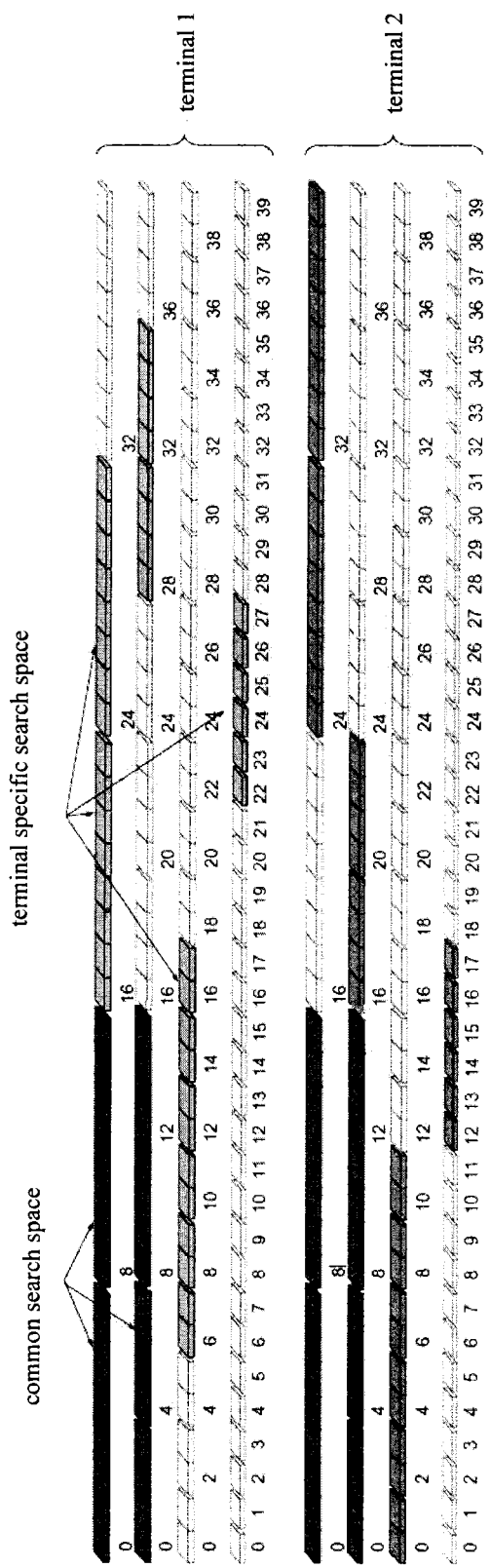
FIG. 1 illustrates a schematic diagram of a search space of a terminal device.

The embodiments of the invention will be described below with reference to the drawings. It shall be noted that an illustration and a description of components and processes, known to those ordinarily skilled in the art, irrelevant to the invention have been omitted in the drawing and the description.

As described above, a terminal device needs to perform blind detection throughout a search space in order to obtain the position at which a PDCCH is placed. Thus if the complexity of the search space of the terminal device can be lowered, then the number of times that blind detection is performed at the terminal device side is reduced to thereby lower the complexity of calculation at the terminal device side. A search space of a terminal device will be described now with reference to FIG. 1. FIG. 1 illustrates a schematic diagram of a search space of a terminal device.

A search space is a series of available control channel sets consisted of several Control Channel Elements (CCEs) at a given aggregation level, and a terminal device shall attempts on decoding these sets. The aggregation level refers to the number of times that DCI information is transmitted with diversity, i.e., the number of CCEs in a PDCCH. In the PDCCH, there may be a plurality of search spaces for a terminal device corresponding to four different aggregation levels of 1, 2, 4 and 8. In each sub-frame, the terminal device attempts on decoding all of possible control channel formats consisted of CCEs in each search space, and if there is a successful CRC check, then contents of the control channel is considered valid for the terminal device, and the terminal device will process relevant information (e.g., scheduling allocation, a scheduling request, etc.).

As illustrated in FIG. 1, there are illustrated two terminal devices including a terminal device 1 and a terminal device 2, and a search space of each of the terminal device 1 and the terminal device 2 includes a terminal device search space and a common search space. In FIG. 1, each row represents a PDCCH, and each square in each row represents a CCE in the PDCCH. As illustrated in FIG. 1, in the first row of the terminal device 1, every 8 CCEs constitute a control channel set, so the first row of the terminal device 1 corresponds to the aggregation level 8. Similarly in the second row of the terminal device 1, every 4 CCEs constitute a control channel set, so the second row of the terminal device 1 corresponds to the aggregation level 4; in the third row of the terminal device 1, every 2 CCEs constitute a control channel set, so the third row of the terminal device 1 corresponds to the aggregation level 2; and in the fourth row of the terminal device 1, one CCE constitute a control channel set, so the fourth row of the terminal device 1 corresponds to the aggregation level 1. Similarly the first row to the fourth rows of the terminal device 2 corresponds to the aggregation 8, 4, 2 and 1 respectively.

A plurality of formats of each downlink control channel can be supported, and these formats are not known in advance to the terminal device. Thus the terminal device needs to perform blind detection on the formats of the downlink control channel. Although the described CCE structure facilitates a lower number of times that blind detection is performed, there is still a need of some mechanism to limit the number of CCE sets to be monitored by the terminal device. Obviously from the perspective of scheduling, the flexibility of scheduling may be degraded and additional processing may be required at a transmitter due to limited CCE sets. Furthermore from the perspective of the complexity of the terminal device, it is undesirable to monitor all of possible CCE sets in the event that there is a wide cell bandwidth. Thus a scheduler shall be limited as little as possible by a search space while limiting the largest number of times that blind detection is performed at the terminal device.

When there are sufficient CCEs in a system, search spaces of respective terminal devices will be different, and there is a terminal device search space for each of the terminal devices in the system at each aggregation level. In some events, it is necessary to address a group or all of the terminal devices in the system, for example, to schedule system information, to transmit paging information, to transmit a power control command, etc., so there is a common search space available to all of the terminal devices, and all of the terminal devices in a control information cell need to monitor CCEs in the common search space. As illustrated in FIG. 1, the terminal device search spaces in the terminal device 1 and the terminal device 2 are different and may partially overlap, but the terminal device search spaces vary with a sub-frame, so it is very likely for them not to overlap in a next sub-frame. Table 1 depicts the monitor of DCI, where a common search space is defined only for CCEs at the aggregation levels of 4 and 8 and the lowest DCI formats (e.g., 0/1A/3/3A and 1C).

TABLE 1

DCI formats monitored by a terminal device in different search spaces

| | A DCI format monitored in a search space | | | |
| --- | --- | --- | --- | --- |
| Mode | Common search space | terminal device search space | terminal device search space | Note |
| 1 | 1A | 1A | 1 | Single-antenna transmission |
| 2 | 1A | 1A | 1 | Transmit diversity |
| 3 | 1A | 1A | 2A | Open-loop spatial multiplexing |
| 4 | 1A | 1A | 1 | Closed-loop spatial multiplexing |
| 5 | 1A | 1A | 1D | Multi-user MIMO |
| 6 | 1A | 1A | 1B | Single-layer codebook based pre-coding |
| 7 | 1A | 1A | 1 | Single-layer transmission using a DM-RS |
| 8 | 1A | 1A | 2B | Dual-layer transmission using a DM-RS |
| 9 | 1A | 1A | 2C | Multi-layer transmission using a DM-RS |

Figure 2:
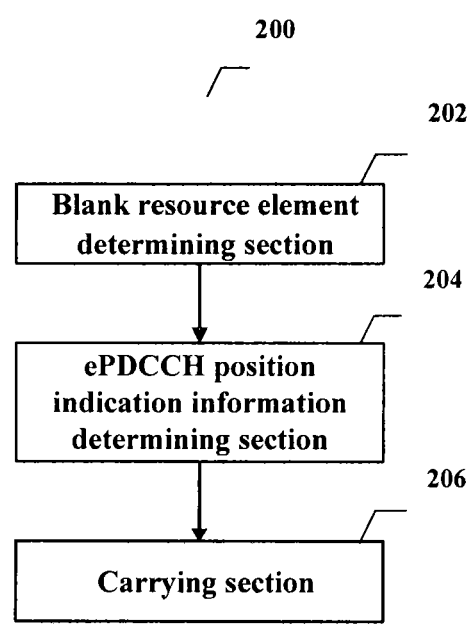
FIG. 2 illustrates a block diagram of an base station device adapted to configure an ePDCCH according to an embodiment of the invention.

An base station device adapted to configure an ePDCCH according to an embodiment of the invention will be described below with reference to FIG. 2. Referring to FIG. 2, there is illustrated a block diagram of an base station device adapted to configure an ePDCCH according to an embodiment of the invention. The base station device 200 includes a blank resource element determining section 202, an ePDCCH position indication information determining section 204 and a carrying section 206.

The blank resource element determining section 202 is adapted to determine, according to system configuration information of a communication system, blank resource elements unused in a physical resource block pair (PRB-pair).

For example, the system configuration information of the communication system may include the number of OFDM symbols carried in a PDCCH. In another example, the system configuration information of the communication system may include the number of ports of a common reference signal. Particularly, for example, the base station device can obtain the number of OFDM symbols carried in a PDCCH from a Physical Control Format Indication Channel (PCFICH). Furthermore, for example, the base station device can obtain the number of ports of a common reference signal from higher-layer signaling. Those ordinarily skilled in the art shall appreciate that the system configuration information of the communication system will not be limited to the number of OFDM symbols carried in a PDCCH or the number of ports of a common reference signal above but can also include other system configuration information known in the art.

The base station device can determine the number of resource elements available to an ePDCCH in each physical resource block pair (PRB-pair) in the system configuration according to the obtained system configuration information of the communication system. Particularly, for example, the base station device can determine the number of resource elements available to an ePDCCH in each physical resource block pair (PRB-pair) corresponding to the obtained number of OFDM symbols carried in a PDCCH and the number of ports of a common reference signal in Table 2 below according to the number of OFDM symbols carried in a PDCCH and the number of ports of a common reference signal.

TABLE 2

The numbers of resource elements available to an ePDCCH in each physical resource block pair in different system configurations

| The number of resource elements per physical resource block pair | | The number of OFDM symbols carried in a PDCCH | | | |
|---|---|---|---|---|---|
| | | 0 | 1 | 2 | 3 |
| The number | 0 | 144 | 132 | 120 | 108 |
| of ports of | 1 | 136 | 126 | 114 | 102 |
| a common | 2 | 128 | 120 | 108 | 96 |
| reference signal | 4 | 120 | 112 | 104 | 92 |

In Table 2 above, each enhanced Control Channel Element (eCCE) includes 36 resource elements, and the number of ports of a Demodulation Reference Signal (DMRS) is 4. As depicted in Table 2, for example, if the number of OFDM symbols carried in a PDCCH is 1 and the number of ports of a common reference signal is 4, then the number of resource elements available to an ePDCCH in each physical resource block pair (PRB-pair) in the configuration is 112. In another example, if the number of OFDM symbols carried in a PDCCH is 3 and the number of ports of a common reference signal is 2, then the number of resource elements available to an ePDCCH in each physical resource block pair (PRB-pair) in the configuration is 96. In still another example, if the number of OFDM symbols carried in a PDCCH is 3 and the number of ports of a common reference signal is 1, then the number of resource elements available to an ePDCCH in each physical resource block pair (PRB-pair) in the configuration is 102. Those ordinarily skilled in the art shall appreciate that Table 2 above is merely illustrative, but there may be different values thereof as required in reality, for example, the values in Table 2 above may vary accordingly given the number 2 of ports of a Demodulation Reference Signal (DMRS). Furthermore those ordinarily skilled in the art shall appreciate that Table 2 above may vary with a different system configuration.

Furthermore the base station device can further determine the number of blank resource elements in each physical resource block pair (PRB-pair) in the configuration according to the obtained system configuration information of the communication system. The blank resource elements in the physical resource block pair (PRB-pair) refer to resource elements, in the physical resource block pair (PRB-pair), which have not been occupied by other signaling, data or pilots. Particularly, for example, the base station device can determine the number of blank resource elements resource elements in each physical resource block pair (PRB-pair) corresponding to the obtained number of OFDM symbols carried in a PDCCH and the number of ports of a common reference signal in Table 3 below according to the number of OFDM symbols carried in a PDCCH and the number of ports of a common reference signal.

TABLE 3

The numbers of blank resource elements in each physical resource block pair in different system configurations

| The number of blank resource elements per physical resource block pair | | The number of OFDM symbols carried in a PDCCH | | | |
|---|---|---|---|---|---|
| | | 0 | 1 | 2 | 3 |
| The number | 0 | 0 | 24 | 12 | 0 |
| of ports of | 1 | 28 | 18 | 6 | 30 |
| a common | 2 | 20 | 12 | 0 | 24 |
| reference signal | 4 | 12 | 4 | 32 | 20 |

In Table 3 above, each eCCE includes 36 resource elements, and the number of ports of a Demodulation Reference Signal (DMRS) is 4. As depicted in Table 3, for example, if the number of OFDM symbols carried in a PDCCH is 1 and the number of ports of a common reference signal is 4, then the number of resource elements available to an ePDCCH in each physical resource block pair (PRB-pair) in the configuration is 112 in Table 2 above, and since each eCCE includes 36 resource elements in this example, the physical resource block pair (PRB-pair) in this configuration can carry at most three eCCEs, and the number of the remaining blank resource elements is (112−36*3)=4. In another example, if the number of OFDM symbols carried in a PDCCH is 3 and the number of ports of a common reference signal is 2, then the number of resource elements available to an ePDCCH in each physical resource block pair (PRB-pair) in the configuration is 96 in Table 2 above, and since each eCCE includes 36 resource elements in this example, the physical resource block pair (PRB-pair) in this configuration can carry at most two eCCEs, and the number of the remaining blank resource elements is (96−36*2)=24. In still another example, if the number of OFDM symbols carried in a PDCCH is 3 and the number of ports of a common reference signal is 1, then the number of resource elements available to an ePDCCH in each physical resource block pair (PRB-pair) in the configuration is 102 in Table 2 above, and since each eCCE includes 36 resource elements in this example, the physical resource block pair (PRB-pair) in this configuration can carry at most two eCCEs, and the number of the remaining blank resource elements is (102−36*2)=30. Those ordinarily skilled in the art shall appreciate that Table 3 above is merely illustrative, but there may be different values thereof as required in reality. For example, if the number of eCCEs carried in a physical resource block pair (PRB-pair) is fixed at some value, or the number of resource elements in each eCCE is fixed at another value than 36, or a dynamically varying value dependent upon some criterion, in a later 3GPP standard, then the number of remaining blank resource elements in each configuration will vary accordingly. Furthermore it shall be noted that those ordinarily skilled in the art can modify Table 3 above accordingly without departing from the spirit of the disclosure of the invention.

The ePDCCH position indication information determining section 204 is adapted to determine, according to the system configuration information of the communication system, terminal device identifier information and channel quality information, ePDCCH position indication information adapted to indicate a position of the ePDCCH in a terminal device search space.

As described above, for example, the system configuration information of the communication system may include the number of OFDM symbols carried in a PDCCH or the number of ports of a common reference signal. In an embodiment of the invention, the number of eCCEs in each physical resource block pair can be set dynamically. For example, the base station device can determine the number of eCCEs in each physical resource block pair (PRB-pair) in the system configuration according to the obtained system configuration information of the communication system. Particularly, for example, the base station device can determine the number of eCCEs in each physical resource block pair (PRB-pair) corresponding to the obtained number of OFDM symbols carried in a PDCCH and the number of ports of a common reference signal in Table 4 below according to the number of OFDM symbols carried in a PDCCH and the number of ports of a common reference signal.

TABLE 4

The numbers of eCCEs in each physical resource block pair in different system configurations

| The number of eCCEs per physical resource block pair | The number of OFDM symbols carried in a PDCCH | | | |
|---|---|---|---|---|
| | 0 | 1 | 2 | 3 |
| The number of ports of a common reference signal  0 | 4 | 3 | 3 | 3 |
| 1 | 3 | 3 | 3 | 2 |
| 2 | 3 | 3 | 3 | 2 |
| 4 | 3 | 3 | 2 | 2 |

In Table 4 above, each eCCE includes 36 resource elements, and the number of ports of a Demodulation Reference Signal (DMRS) is 4. As depicted in Table 4, for example, if the number of OFDM symbols carried in a PDCCH is 1 and the number of ports of a common reference signal is 4, then the number of resource elements available to an ePDCCH in each physical resource block pair (PRB-pair) in the configuration is 112 in Table 2 above, and since each eCCE includes 36 resource elements in this example, the physical resource block pair (PRB-pair) in this configuration can carry at most three eCCEs so that the number of the remaining blank resource elements will be as low as possible. In another example, if the number of OFDM symbols carried in a PDCCH is 3 and the number of ports of a common reference signal is 2, then the number of resource elements available to an ePDCCH in each physical resource block pair (PRB-pair) in the configuration is 96 in Table 2 above, and since each eCCE includes 36 resource elements in this example, the physical resource block pair (PRB-pair) in this configuration can carry at most two eCCEs so that the number of the remaining blank resource elements will be as low as possible. In still another example, if the number of OFDM symbols carried in a PDCCH is 3 and the number of ports of a common reference signal is 1, then the number of resource elements available to an ePDCCH in each physical resource block pair (PRB-pair) in the configuration is 102 in Table 2 above, and since each eCCE includes 36 resource elements in this example, the physical resource block pair (PRB-pair) in this configuration can carry at most two eCCEs so that the number of the remaining blank resource elements will be as low as possible. Those ordinarily skilled in the art shall appreciate that Table 4 above is merely illustrative, but there may be different values thereof as required in reality. Furthermore it shall be noted that those ordinarily skilled in the art can modify Table 4 above accordingly without departing from the spirit of the disclosure of the invention.

As recognized by the inventors of the present application, in the examples above, there will be a varying number of eCCEs in a physical resource block pair (PRB-pair) and consequentially also an aggregation level set to be varied accordingly in each sub-frame. Generally each aggregation level in the aggregation level set may be an integer multiple of the number of Enhanced Control Channel Elements (eCCEs) contained in the physical resource block pair (PRB-pair) to facilitate reasonable blind detection and further decoding by the terminal device. After the base station device determines the number of eCCEs in each physical resource block pair (PRB-pair) in the system configuration according to the obtained system configuration information of the communication system, the base station device can obtain a corresponding aggregation level set according to the determined number of eCCEs in each physical resource block pair (PRB-pair). Particularly, for example, the base station device can obtain the corresponding aggregation level set in Table below 5 according to the determined number of eCCEs in each physical resource block pair (PRB-pair).

TABLE 5

Aggregation level sets corresponding to different numbers of eCCEs

| | The number of eCCEs per physical resource block pair | | |
|---|---|---|---|
| | 2 | 3 | 4 |
| A corresponding aggregation level set | {1, 2, 4, 8} | {1, 3, 6, 9} | {1, 4, 8, 12} |

In Table 5 above, each eCCEs include 36 resource elements, and the number of ports for a Demodulation Reference Signal (DMRS) is 4. Further to the example above, as depicted in Table 5, each aggregation level in the aggregation level set corresponding to each number of eCCEs per physical resource block pair is an integer multiple of the number of eCCEs contained in the physical resource block pair (PRB-pair) to facilitate reasonable blind detection and further decoding by the terminal device. For example, if the determined number of eCCEs in each physical resource block pair (PRB-pair) is 3 (for example, which corresponds to the system configuration in which the number of OFDM symbols carried in a PDCCH is 1 and the number of ports of a common reference signal is 4), then the corresponding aggregation level set in the configuration is {1,3,6,9}. In another example, if the determined number of eCCEs in each physical resource block pair (PRB-pair) is 2 (for example, which corresponds to the system configuration in which the number of OFDM symbols carried in a PDCCH is 3 and the number of ports of a common reference signal is 2), then the corresponding aggregation level set in the configuration is {1,2,4,8}. In still another example, if the determined number of eCCEs in each physical resource block pair (PRB-pair) is 4, then the corresponding aggregation level set in the configuration is {1,4,8,12}. Those ordinarily skilled in the art shall appreciate that Table 5 above is merely illustrative, but there may be different values thereof as required in reality. Furthermore it shall be noted that those ordinarily skilled in the art can modify Table 5 above accordingly without departing from the spirit of the discourse of the invention.

According to a preferred embodiment of the invention, for example, the ePDCCH position indication information includes an aggregation level of the terminal device search space, and a start position of the ePDCCH in the terminal device search space is determined according to the aggregation level of the terminal device search space and the terminal device identifier information.

As described above, the base station device can obtain the corresponding aggregation level set according to the system configuration information of the communication system. The base station device can determine the aggregation level of the terminal device search space from the corresponding aggregation level set according to a specific criterion after obtaining the corresponding aggregation level set. Particularly, for example, the base station device can determine the aggregation level of the terminal device search space from the corresponding aggregation level set according to channel quality information measured and fed by the terminal device to the base station device. If there is a lower channel quality, then the determined aggregation level will be higher accordingly; and if there is a higher channel quality, then the determined aggregation level will be lower accordingly. In another example, the base station device can determine the aggregation level of the terminal device search space from the corresponding aggregation level set according to the type of control signaling. If there is a higher importance of the control signaling, then the determined aggregation level will be higher accordingly; and if there is a lower importance of the control signaling, then the determined aggregation level will be lower accordingly. Those ordinarily skilled in the art shall appreciate that the base station device can further determine the aggregation level of the terminal device search space from the corresponding aggregation level set according to both the channel quality information measured and fed by the terminal device to the base station device, and the type of the control signaling. Furthermore those ordinarily skilled in the art shall appreciate that the above-mentioned types of the channel information and the control signaling are merely illustrative, but the base station device can alternatively determine the aggregation level of the terminal device search space from the corresponding aggregation level set according to another criterion.

Further to the example above, for example, if the corresponding aggregation level set determined in the system configuration, in which the number of OFDM symbols carried in a PDCCH is 1 and the number of ports of a common reference signal is 4, is {1,3,6,9}, then the base station device can determine the aggregation level 3 of the terminal device search space from the corresponding aggregation level set {1,3,6,9} according to both the channel quality information measured and fed by the terminal device to the base station device, and/or the type of the control signaling. In another example, if the corresponding aggregation level set determined in the system configuration, in which the number of OFDM symbols carried in a PDCCH is 3 and the number of ports of a common reference signal is 2, is {1,2,4,8}, then the base station device can determine the aggregation level 4 of the terminal device search space from the corresponding aggregation level set {1,2,4,8} according to both the channel quality information measured and fed by the terminal device to the base station device, and/or the type of the control signaling.

In another embodiment of the invention, there is an invariable corresponding aggregation level set, e.g., {1,2,4,8}, in each configuration, and those ordinarily skilled in the art that the base station device will not particularly obtain the corresponding aggregation level set any longer according to the system configuration information of the communication system, but the base station device can determine the aggregation level of the terminal device search space as above from a predetermined aggregation level set directly according to the predetermined aggregation level set.

After the aggregation level of the terminal device search space is determined, the base station device can determine the start position of the ePDCCH in the terminal device search space according to the aggregation level of the terminal device search space and the terminal device identifier information. For example, the terminal device identifier information can be a Radio Network Temporary Identifier (RNTI) of the terminal device. Those ordinarily skilled in the art shall appreciate that the Radio Network Temporary Identifier (RNTI) above of the terminal device is merely illustrative, but the terminal device identifier information can alternatively be other information of the terminal device. Furthermore the start position in the search space can be calculated as described in the equation, in which a start position in a search space is calculated, and details thereof in the PDCCH protocol TS 36.213, section 9.1.1, so a detailed description thereof will not be repeated here.

According to a further preferred embodiment of the invention, for example, the ePDCCH position indication information further includes an offset of the ePDCCH in the terminal device search space.

Particularly the base station device can place the ePDCCH at an appropriate position in the terminal device search space according to a resource use condition, and thus the offset of the ePDCCH in the terminal device search space can be determined. As illustrated in FIG. 2, for example, the offset of the ePDCCH in the terminal device search space is 2.

The carrying section 206 is adapted to carry the ePDCCH position indication information onto the blank resource elements so as to obtain a sub-frame that contains additional signaling carrying the ePDCCH position indication information, and transmitting the sub-frame to the terminal device.

As described above, the ePDCCH position indication information can include the aggregation of the terminal device search space and the offset of the ePDCCH in the terminal device search space. Thus, the ePDCCH position indication information can be carried onto the blank resource elements, so as to obtain the sub-frame that contains the additional signaling carrying the ePDCCH position indication information, particularly by carrying the aggregation of the terminal device search space and/or the offset of the ePDCCH in the terminal device search space onto the blank resource elements so as to obtain the sub-frame that contains the additional signaling carrying the aggregation and/or the offset.

Figure 3:
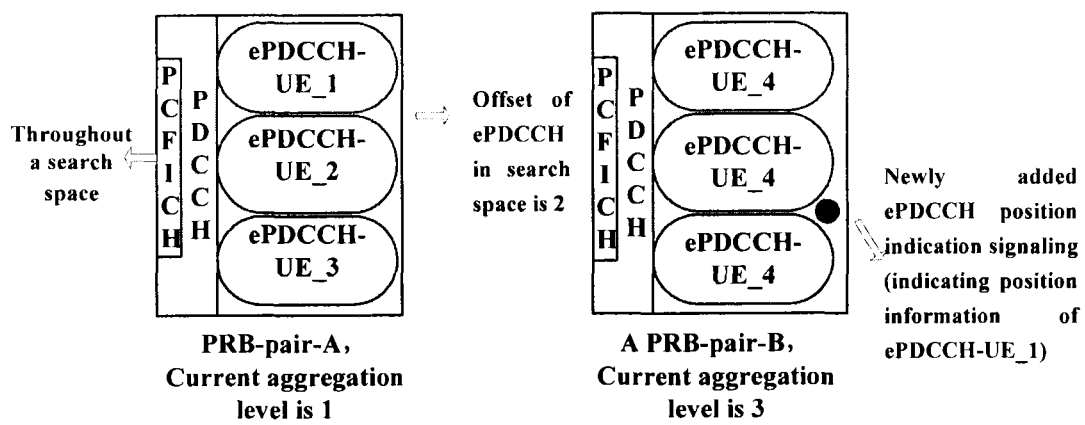
FIG. 3 illustrates a schematic diagram of carrying ePDCCH position indication information in additional signaling.

As illustrated in FIG. 3, the position indication information of the ePDCCH-terminal device_1 is mapped into the PRB-pair-B. For example, the additional signaling in the PRB-pair-B (indicated by the black dot) can indicate the aggregation level of the ePDCCH-terminal device_1 in the PRB-pair-A (for example, the aggregation level is 3 in FIG. 3). Furthermore, the additional signaling in the PRB-pair-B can further indicate the offset of the ePDCCH-terminal device_1 in the search space (for example, the offset is 2 in FIG. 3).

In order to carry the ePDCCH position indication information onto the blank resource elements so as to obtain the sub-frame that contains the additional signaling carrying the ePDCCH position indication information, the ePDCCH position indication information can be encoded appropriately. For example, the ePDCCH position indication information can be encoded in a two-bit binary coding scheme. Those ordinarily skilled in the art shall appreciate that the two-bit binary coding scheme is merely illustrative, but the ePDCCH position indication information can alternatively be encoded in another appropriate coding scheme. Furthermore since the number of blank resource elements in a PRB-pair differs with a different system configuration, the number of blank resource elements available to the additional signaling will also vary. Thus the size of the additional signaling (i.e., the coding scheme) will vary with a different number of blank resource elements.

Particularly, for example, the aggregation level in the ePDCCH position indication information can be encoded in two bits in Table 6 below.

TABLE 6

Aggregation levels encoded in two bits

| | eCCE per physical resource block pair | | |
|---|---|---|---|
| | 2 | 3 | 4 |
| Corresponding aggregation level set | {1, 2, 4, 8} | {1, 3, 6, 9} | {1, 4, 8, 12} |
| Corresponding encoded aggregation levels | {00, 01, 10, 11} | {00, 01, 10, 11} | {00, 01, 10, 11} |

In Table 6 above, each eCCE includes 36 resource elements, and the number of ports for a Demodulation Reference Signal (DMRS) is 4. As depicted in Table 6, for example, if the aggregation level is 3 in the aggregation level set, then the aggregation level is encoded correspondingly as 01. Those ordinarily skilled in the art shall appreciate that Table 6 above is merely illustrative, but there may be different values thereof as required in reality. Furthermore those ordinarily skilled in the art shall appreciate that Table 6 above can be predetermined as known in the art.

Furthermore, for example, the offset of the ePDCCH in the terminal device search space can be encoded in two bits in the ePDCCH position indication information, in Table 7 below.

TABLE 7

2-bit encoded offset of the ePDCCH in the terminal device search space

| | Offset of the ePDCCH in the terminal device search space | | | |
|---|---|---|---|---|
| | 0 | 1 | 2 | 3 |
| Encoded offset | 00 | 01 | 10 | 11 |

In Table 7 above, each eCCE includes 36 resource elements, and the number of ports for a Demodulation Reference Signal (DMRS) is 4. As depicted in Table 7, for example, if the offset of the ePDCCH in the terminal device search space is 2, then the offset is encoded correspondingly as 10. Those ordinarily skilled in the art shall appreciate that Table 7 above is merely illustrative, but there may be different values thereof as required in reality. Furthermore those ordinarily skilled in the art shall appreciate that Table 7 above can be predetermined as known in the art.

According to a preferred embodiment of the invention, the additional signaling can be encoded in a different length of bits according to the number of blank resource elements.

Particularly in order to make the ePDCCH position indication information carried in the additional signaling more robust, the additional signaling can be encoded in a different length of bits according to the number of blank resource elements to thereby extend the bits, in which the ePDCCH position indication information is encoded, to a larger number of bits. For example, if the aggregation level in the ePDCCH position indication information is encoded into two bits, and the offset in the ePDCCH position indication information is encoded into two bits, that is, the ePDCCH position indication information is encoded into four bits, then the additional signaling can be encoded into 16 bits, 24 bits, 32 bits or another number of bits in Table 8 or Table 9 below to thereby extend the four bits, in which the ePDCCH position indication information is encoded, to the larger number of bits, thus improving the robustness of transmission of data over the channel. Generally an extended larger number of bits will result in higher robustness but a higher resource occupancy ratio. Since the number of the remaining blank resource elements in each physical resource block according to the invention may vary, an extension scheme in which there are a variable number of code bits will be adopted according to the invention. Particularly Table 8 depicts extension and mapping of the ePDCCH position indication information to the blank resource elements in the PRB-pair in a localized mapping manner, and Table 9 depicts extension and mapping of the ePDCCH position indication information to the blank resource elements in the PRB-pair in a distributed mapping manner. The localized mapping manner and the distributed mapping manner will be described below in details.

TABLE 8

| Blank resource elements per physical resource block pair | Extension of 4 bits | Mapping of ePDCCH position indication information |
|---|---|---|
| 0 | No extension | No mapping |
| 4 | 8 bits | 4 resource elements (1 physical resource block pair) |
| 6 | 12 bits | 6 resource elements (1 physical resource block pair) |
| 12 | 24 bits | 12 resource elements (1 physical resource block pair) |
| 18 | 32 bits | 16 resource elements (1 physical resource block pair) |
| 20 | 32 bits | 16 resource elements (1 physical resource block pair) |
| 24 | 32 bits | 16 resource elements (1 physical resource block pair) |
| 28 | 32 bits | 16 resource elements (1 physical resource block pair) |
| 30 | 32 bits | 16 resource elements (1 physical resource block pair) |
| 32 | 32 bits | 16 resource elements (1 physical resource block pair) |

In Table 8 above, each eCCE includes 36 resource elements, and the number of ports for a Demodulation Reference Signal (DMRS) is 4. Those ordinarily skilled in the art shall appreciate that Table 8 above is merely illustrative, but there may be different values thereof as required in reality. Furthermore those ordinarily skilled in the art shall appreciate that Table 8 above can be predetermined as known in the art.

TABLE 9

| Blank resource elements per physical resource block pair | Extension of 4 bits | Mapping of ePDCCH position indication information | The number of terminal devices for which terminal device-ePDCCH position indication information can be carried in each PRB |
|---|---|---|---|
| 0 | No extension | No mapping | 0 |
| 4 | 16 bits | 8 resource elements (2 physical resource block pair) | 1 |
| 6 | 24 bits | 12 resource elements (2 physical resource block pair) | 1 |
| 12 | 32 bits | 16 resource elements (4 physical resource block pair) | 3 |
| 18 | 32 bits | 16 resource elements (4 physical resource block pair) | 4 |
| 20 | 32 bits | 16 resource elements (4 physical resource block pair) | 4 |
| 24 | 32 bits | 16 resource elements (4 physical resource block pair) | 4 |
| 28 | 32 bits | 16 resource elements (4 physical resource block pair) | 4 |
| 30 | 32 bits | 16 resource elements (4 physical resource block pair) | 4 |
| 32 | 32 bits | 16 resource elements (4 physical resource block pair) | 4 |

In Table 9 above, each eCCE includes 36 resource elements, and the number of ports for a Demodulation Reference Signal (DMRS) is 4. Those ordinarily skilled in the art shall appreciate that Table 9 above is merely illustrative, but there may be different values thereof as required in reality. Furthermore those ordinarily skilled in the art shall appreciate that Table 9 above can be predetermined as known in the art.

According to a preferred embodiment of the invention, the additional signaling can be placed into one or more continuous physical resource block pairs (PRB-pairs) in a localized mapping manner, or the additional signaling can be placed into a plurality of physical resource block pairs (PRB-pairs) in a distributed mapping manner, according to the number of the blank resource elements.

Figure 4A:
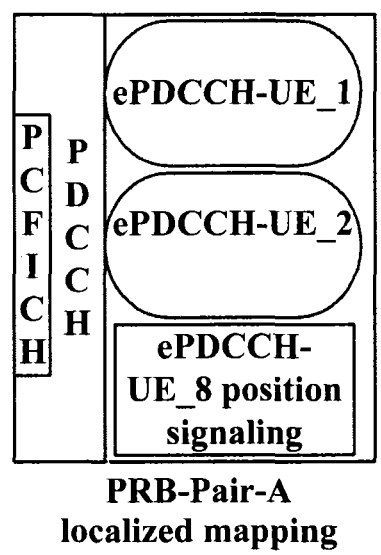
FIG. 4A illustrates a schematic diagram of localized mapping of additional signaling carrying ePDCCH position indication information.

The localized mapping manner in which the additional signaling carrying the ePDCCH position indication information is mapped will be described below with reference to FIG. 4A and Table 8. FIG. 4A illustrates a schematic diagram of localized mapping of additional signaling carrying ePDCCH position indication information. Table 8 depicts extension and mapping of the ePDCCH position indication information to the blank resource elements in the PRB-pair in the localized mapping manner.

In the event that the number of blank resource elements in the PRB-pair is more than the number of resource elements required for the additional signaling, the additional signaling can be placed into a PRB-pair in the localized mapping manner. As depicted in Table 8, for example, the number of blank resource elements in the PRB-pair is 18, and the number of resource elements required for the additional signaling is 16, so as illustrated in FIG. 4A, the additional signaling of the ePDCCH-terminal device_8 position indication information can be placed into the PRB-pair-A in the localized mapping manner. It shall be noted that the localized mapping manner mentioned here does not refer to an absolute concept, but any mapping manner, in which the additional signaling is placed as much as possible into one or more continuous physical resource block pairs, can be referred to as the localized mapping manner. For example, the ePDCCH position indication information can be extended into a number as large as possible of bits to improve the robustness. In Table 8, the number of extension bits in the configuration in which the number of blank resource elements is 4 can alternatively be set at 16. Thus blank REs in a physical resource block pair can only carry 8 bits, so the extended ePDCCH position indication information will be carried in at least two physical resource block pairs. In this event, the additional signaling can be placed into two consecutive physical resource block pairs (PRB-pairs), and this mapping manner is a localized mapping manner relative to the distributed mapping manner for a diversity gain.

Figure 4B:
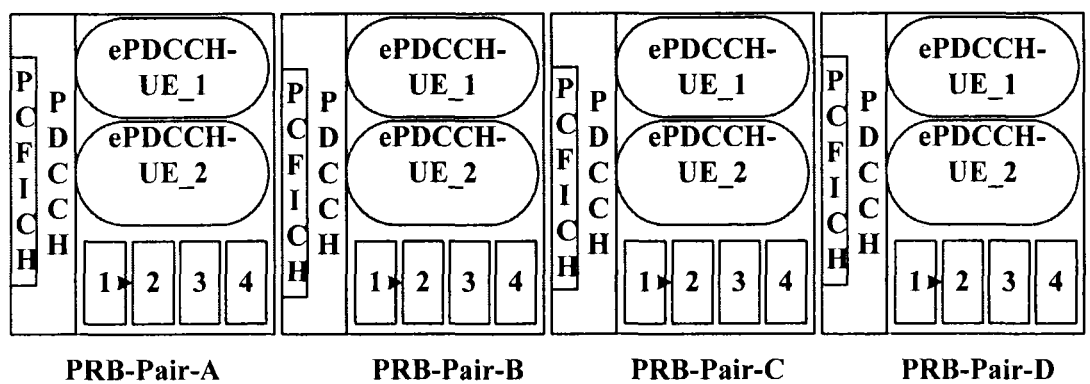
FIG. 4B illustrates a schematic diagram of distributed mapping of additional signaling carrying ePDCCH position indication information.

The distributed mapping manner refers to such a mapping manner that even if the number of blank resource elements in the PRB-pair is more than the number of resource elements required for the additional signaling, the additional signaling can be split and distributed into different PRB-pairs for a gain of frequency diversity. As depicted in Table 9, for example, the number of blank resource elements in the PRB-pair is 18 and the number of resource elements required for the additional signaling is 16, so as illustrated in FIG. 4B, the additional signaling of the terminal device 1 can be split into four components which are placed respectively into four PRB-pairs including the PRB-pair-A, the PRB-pair-B, the PRB-pair-C, and the PRB-pair-D. Similarly the additional signaling of the terminal device 2 to the terminal device4 can be split into four components which are placed respectively into four PRB-pairs including the PRB-pair-A, the PRB-pair-B, the PRB-pair-C, and the PRB-pair-D. Thus a part of the additional signaling of the terminal device 1 to the terminal device 4 will be carried in a PRB-pair. In Table 9, a signaling space is defined to carry the additional signaling of the ePDCCH position indication information of at most four terminal devices, so the terminal device will perform detection for at most four times. Distributed mapping can come with a gain of frequency diversity despite a slight increase in complexity.

According to a preferred embodiment of the invention, mapping between the terminal device and the physical resource block pair (PRB-pair) is performed according to the terminal device identifier information in any one of the following mapping manners: one terminal device corresponds to one physical resource block pair (PRB-pair), one terminal device corresponds to a plurality of physical resource block pairs (PRB-pairs), a plurality of terminal devices correspond to one physical resource block pair (PRB-pair), or a plurality of terminal devices correspond to a plurality of physical resource block pairs (PRB-pairs).

Figure 5:
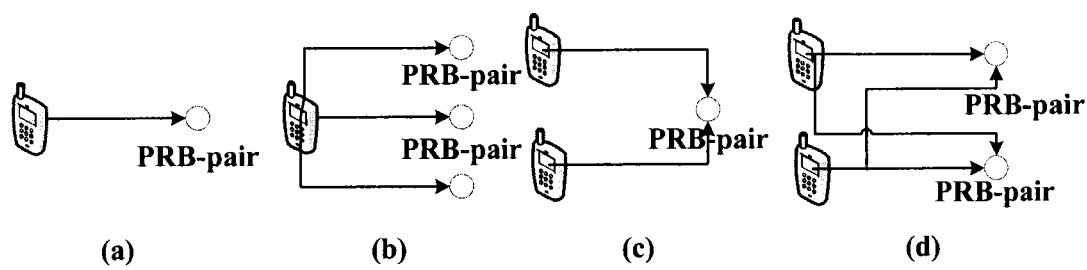
FIG. 5 illustrates a schematic diagram of mapping between a terminal device and a physical resource block pair (PRB-pair)

Mapping between a terminal device and a physical resource block pair (PRB-pair) will be described below with reference to FIG. 5. FIG. 5 illustrates a schematic diagram of mapping between a terminal device and a physical resource block pair (PRB-pair).

According to the invention, direct mapping between the terminal device and the PRB-pair in which the additional signaling of the ePDCCH position indication information thereof is placed is merely dependent upon the terminal device identifier information. However the following four scenarios will be allowed to occur: 1) one terminal device corresponds to one PRB-pair, as illustrated in FIG. 5(a); 2) one terminal device corresponds to a plurality of PRB-pair, as illustrated in FIG. 5(b); 3) a plurality of terminal devices correspond to one PRB-pair, as illustrated in FIG. 5(c); and 4) a plurality of terminal devices correspond to a plurality of PRB-pairs, as illustrated in FIG. 5(d).

As depicted in Table 8 and Table 9 and illustrated in FIG. 4B, if a plurality of terminal devices are mapped into a PRB-pair space, then the current terminal device needs to perform blind detection for several times in the ePDCCH position indication signaling space to obtain a final result.

A particular mapping rule under which the terminal device is mapped to the PRB-pair can be set flexibly as required in reality. For example, if the terminal device identifier information is terminal device1, terminal device2, terminal device3, etc.; and the PRB-pairs in the ePDCCH signaling space are numbered PRB1, PRB2, PRB3, etc., then mapping between the terminal device identifier information and the serial numbers of the PRB-pairs can be as depicted in Table 10 or Table 11 or Table 12.

TABLE 10

First mapping between terminal device identifier information and serial numbers of PRB-pairs

| terminal device identifier information | terminal device1 | terminal device2 | terminal device3 | ... |
|---|---|---|---|---|
| Serial number of PRB | PRB1 | PRB2 | PRB3 | ... |

TABLE 11

Second mapping between terminal device identifier information and serial numbers of PRB-pairs

| terminal device identifier information | terminal device1 | terminal device2 | terminal device3 | ... |
|---|---|---|---|---|
| Serial number of PRB | PRB1, PRB2 | PRB3, PRB4 | PRB5, PRB6 | ... |

TABLE 12

Third mapping between terminal device identifier information and serial numbers of PRB-pairs

| terminal device identifier information | terminal device1 | terminal device2 | terminal device3 | ... |
|---|---|---|---|---|
| Serial number of PRB | PRB1, PRB2, PRB3, PRB4 | PRB1, PRB2, PRB3, PRB4 | PRB1, PRB2, PRB3, PRB4 | ... |

Those ordinarily skilled in the art shall appreciate that Table 10 to Table 12 above are merely illustrative, but there may be different values thereof as required in reality. Furthermore those ordinarily skilled in the art shall appreciate that Table 10 to Table 12 above can be predetermined as known in the art.

Figure 6:
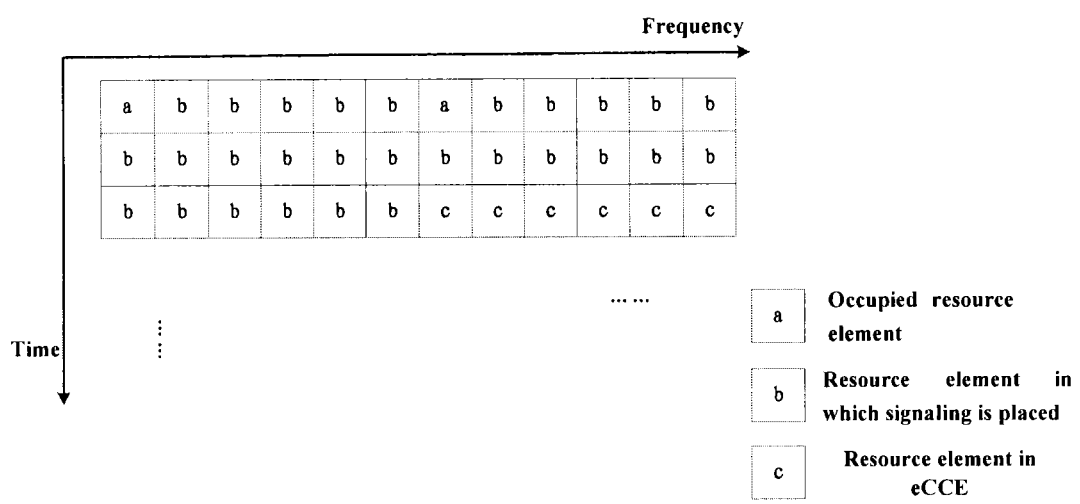
FIG. 6 illustrates a schematic diagram of placing additional signaling into blank resource elements in a PRB-pair.

The blank resource elements occupied by the additional signaling, and the eCCEs, are generally positioned in a PRB-pair for the purpose of facilitating operations, and these positions shall be agreed upon between the base station device and the terminal device. As illustrated in FIG. 6, for example, blank resource elements in a PRB-pair can be localized upfront the PRB-pair. Moreover as illustrated in FIG. 6, the additional signaling can be placed firstly in the frequency domain (as denoted by the horizontal axis in FIG. 6) and then in the time domain (as denoted by the vertical axis in FIG. 6).

According to a preferred embodiment of the invention, when a plurality of terminal devices are mapped into the same physical resource block pair (PRB-pair), scrambling is performed using the terminal device identifier information so as to distinguish, in the same physical resource block pair (PRB-pair), ePDCCH position indication information of the different terminal devices.

If there is additional signaling of ePDCCH position indication information of a plurality of terminal device in the same signaling space, then the additional signaling of the different terminal devices can be scrambled using terminal device identifier information to be distinguished from each other. In this event, the terminal device needs to perform detection for several times to obtain the additional signaling of the ePDCCH position indication information specific to the terminal device. As depicted in Table 9 above, a signaling space is defined to carry the additional signaling of the ePDCCH position indication information of at most four terminal devices, so the terminal device will perform detection for at most four times to obtain the additional signaling of the ePDCCH position indication information specific to the terminal device.

Figure 7:
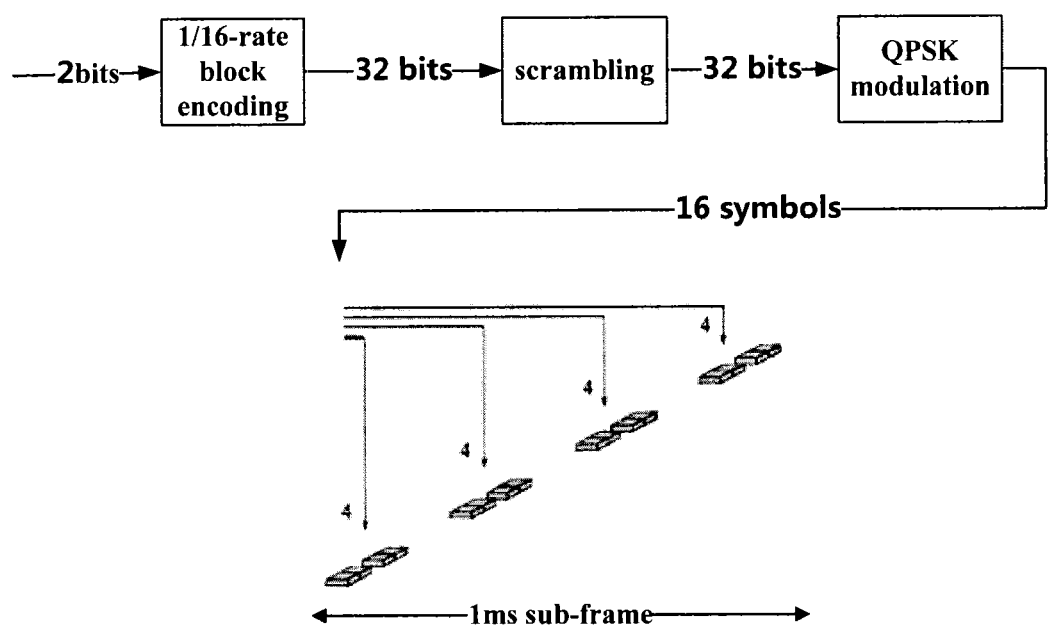
FIG. 7 illustrates a schematic diagram of encoding and mapping additional signaling carrying ePDCCH position indication information.

Encoding and mapping of additional signaling carrying ePDCCH position indication information will be described below with reference to FIG. 7. FIG. 7 illustrates a schematic diagram of encoding and mapping additional signaling carrying ePDCCH position indication information.

Figure 8:
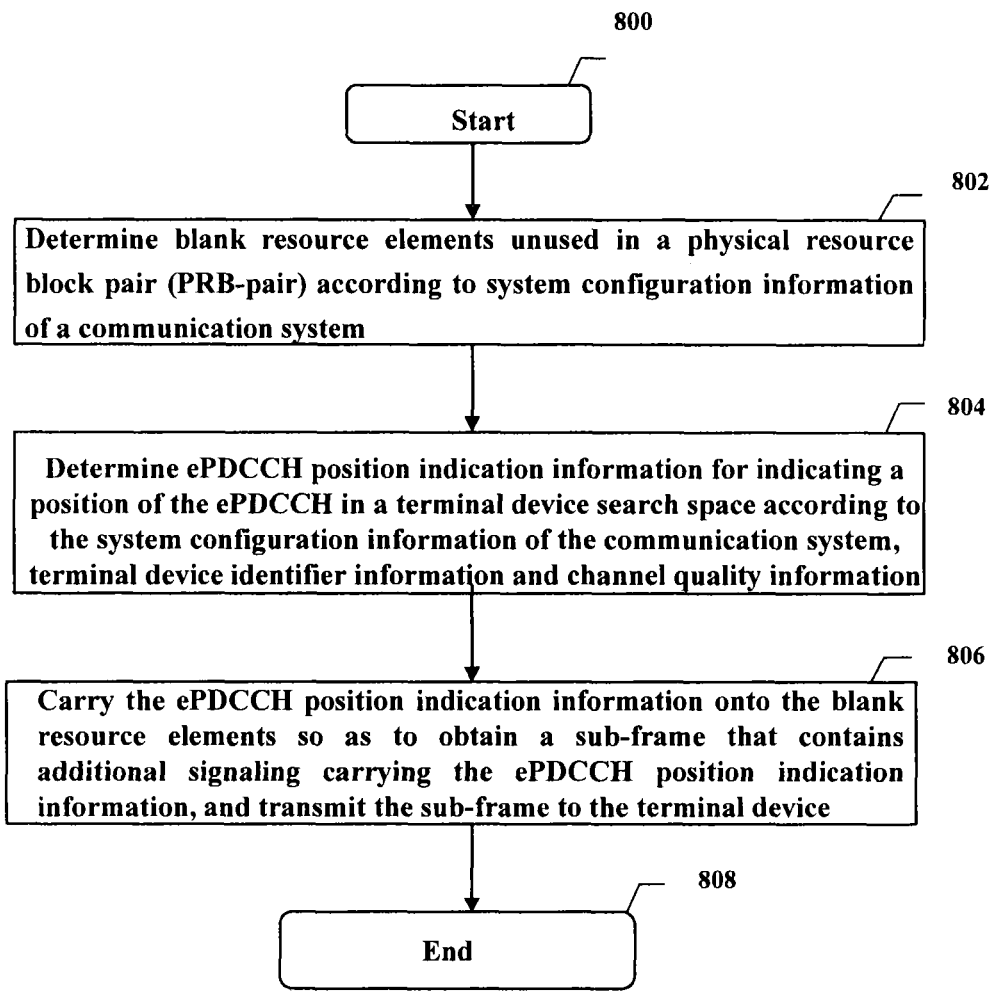
FIG. 8 illustrates a flow chart of a method for configuring an ePDCCH according to an embodiment of the invention.
Figure 9:
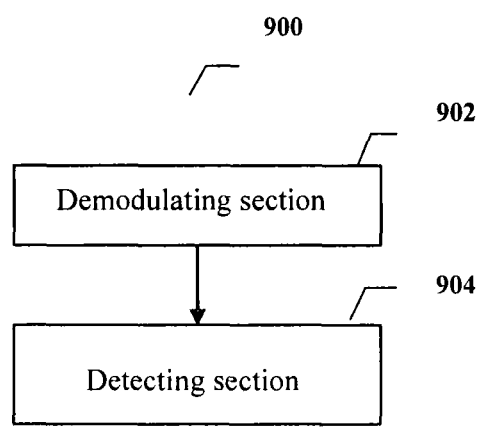
FIG. 9 illustrates a block diagram of a terminal device adapted to detect an ePDCCH according to an embodiment of the invention.

As described above, the base station device can determine in FIG. 8 or FIG. 9 the way of carrying and mapping the ePDCCH position indication information of the terminal device in the current system configuration. Then as illustrated in FIG. 7, the base station device can calculate the position of the PRB-pair carrying the ePDCCH position indication information of the terminal device in the current system configuration according to the terminal device identifier information and QPSK modulate and then place the bits sequentially in the corresponding PRB-pair.

According to the present embodiment, the blank resource elements in the ePDCCH can be made full use by adding new signaling to the blank resource elements to thereby lower the number of times that blind detection is performed at the terminal device side and consequentially the complexity of calculation at the terminal device side.

A method for configuring an ePDCCH according to an embodiment of the invention will be described below with reference to FIG. 8. FIG. 8 illustrates a flow chart of a method for configuring an ePDCCH according to an embodiment of the invention.

The method starts with the step 800. In the step 802, blank resource elements unused in a physical resource block pair (PRB-pair) are determined according to system configuration information of a communication system. Next in the step 804, ePDCCH position indication information for indicating a position of the ePDCCH in a terminal device search space is determined according to the system configuration information of the communication system, terminal device identifier information and channel quality information. Next in the step 806, the ePDCCH position indication information is carried onto the blank resource elements so as to obtain a sub-frame that contains additional signaling carrying the ePDCCH position indication information, and the sub-frame is transmitted to the terminal device. Finally the method ends at the step 808.

The method for configuring an ePDCCH according to the embodiment of the invention is a method corresponding to the base station device 200 adapted to configure an ePDCCH according to the embodiment of the invention, a detailed description thereof will not be repeated here.

A terminal device adapted to detect an ePDCCH according to an embodiment of the invention will be described below with reference to FIG. 9. FIG. 9 illustrates a block diagram of a terminal device adapted to detect an ePDCCH according to an embodiment of the invention. As illustrated in FIG. 9, the terminal device 900 adapted to detect an ePDCCH includes a demodulating section 902 and a detecting section 904.

The demodulating section 902 is adapted to receive, from an base station device, a sub-frame that contains additional signaling carrying ePDCCH position indication information, and obtaining the ePDCCH position indication information from demodulation of the sub-frame, where the ePDCCH position indication information is adapted to indicate a position of the ePDCCH in a terminal device search space, and the additional signaling carrying ePDCCH position indication information is obtained on the basis of carrying the ePDCCH position indication information onto blank resource elements unused in a physical resource block pair (PRB-pair).

The terminal device receives the data from the base station device. The terminal device determines the number of OFDM symbols occupied by a PDCCH by demodulating a Physical Control Format Indication Channel (PCFICH). Furthermore the terminal device obtains the number of ports of a system common reference signal and the number of ports of a Demodulation Reference Signal (DMRS) from higher-layer signaling, or the terminal device only obtains the number of ports of a system common reference signal in the event that the number of ports of a DMRS is known.

The terminal device determines the number of blank resource elements in a PRB-pair in the current system configuration, in Table 3 above. Furthermore the terminal device obtains an aggregation level set corresponding to the terminal device itself in Table 5 above. Furthermore the terminal device determines the manner, in which the ePDCCH position indication information is mapped in the current system configuration, in Table 8 or Table 9 above.

According to a preferred embodiment of the invention, the physical resource block pair (PRB-pair), in which the ePDCCH position indication information is placed, can be determined according to terminal device identifier information. Particularly, for example, the terminal device can determine the position of the PRB-pair carrying the ePDCCH position indication information of the terminal device in the current system configuration according to the terminal device identifier information and the current manner in which the ePDCCH position indication information is mapped, in Table 10, Table 11 or Table 12 above.

The terminal device demodulates the ePDCCH position indication information of the terminal device at the position of the additional signaling in the corresponding PRB-pair in some order, e.g., firstly in the frequency domain and then in the time domain as illustrated in FIG. 6.

According to a preferred embodiment of the invention, the ePDCCH position indication information can include an aggregation level of a terminal device search space. According to a preferred embodiment of the invention, the ePDCCH position indication information can further include an offset of the ePDCCH in the terminal device search space. After the ePDCCH position indication information of the terminal device is demodulated, the aggregation level of the terminal device and the offset of the ePDCCH in the terminal device search space can be obtained in Table 6 and Table 7 above.

According to a preferred embodiment of the invention, a start position of the ePDCCH in the terminal device search space can be determined according to the aggregation level of the terminal device search space and terminal device identifier information. The start position in the search space can be calculated as described in the equation, in which a start position in a search space is calculated, and details thereof in the PDCCH protocol TS 36.213, section 9.1.1, so a detailed description thereof will not be repeated here. After the start position of the ePDCCH in the search space is determined, the position of the ePDCCH in the terminal device search space can be determined according to the offset of the ePDCCH in the terminal device search space. After the position of the ePDCCH in the terminal device search space is determined, the additional signaling carrying the ePDCCH position indication information can be demodulated according to the position of the ePDCCH in the terminal device search space to thereby obtain the ePDCCH position indication information. Those ordinarily skilled in the art shall appreciate that the offset above may not be necessary, that is, blind detection can alternatively be performed sequentially at possible position following the start position only according to the start position of the ePDCCH in the search space to thereby demodulate the additional signaling carrying the ePDCCH position indication information.

According to a preferred embodiment of the invention, when ePDCCH position indication information of a plurality of terminal devices exists in the same physical resource block pair (PRB-pair), descrambling is performed using the terminal device identifier information and a CRC check is performed, so as to distinguish, in the same physical resource block pair (PRB-pair), the ePDCCH position indication information of the different terminal devices.

The detecting section 904 is adapted to detect the ePDCCH in the terminal device search space based on the ePDCCH position indication information obtained from demodulation.

According to the present embodiment, since the terminal device can demodulate the new signaling added to the blank resource elements in the ePDCCH to obtain the ePDCCH position indication information and detect the ePDCCH in the terminal device search space according to the obtained ePDCCH position indication information to thereby lower the number of times that blind detection is performed at the terminal device side and consequentially the complexity of calculation at the terminal device side.

Figure 10:
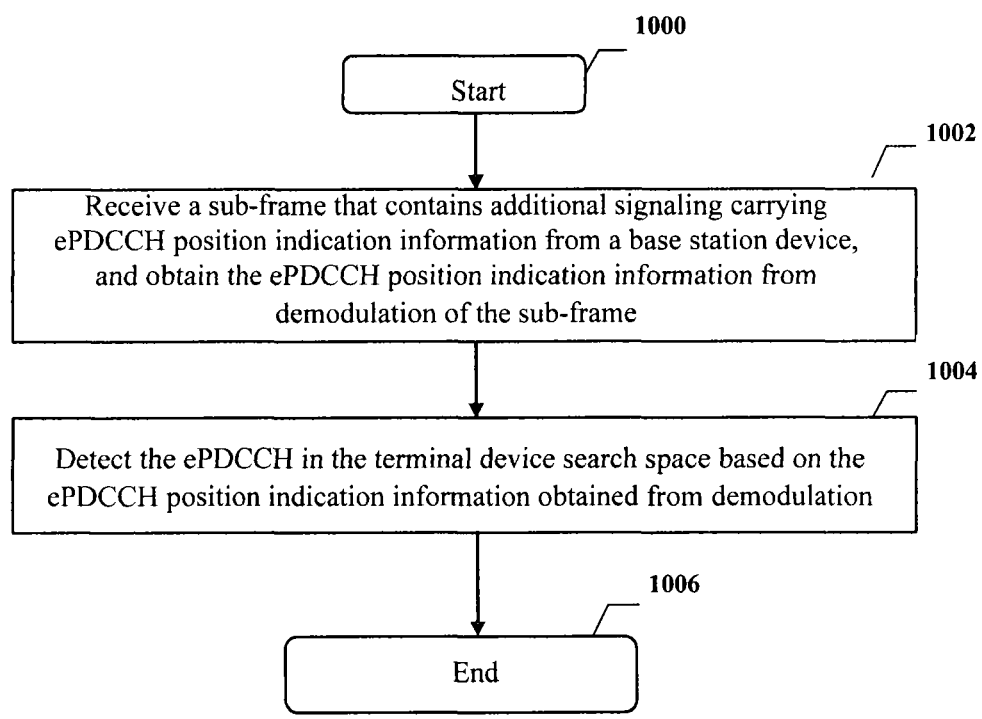
FIG. 10 illustrates a flow chart of a method for detecting an ePDCCH according to an embodiment of the invention.

A method for detecting an ePDCCH according to an embodiment of the invention will be described below with reference to FIG. 10. FIG. 10 illustrates a flow chart of a method for detecting an ePDCCH according to an embodiment of the invention.

The method starts with the step 1000. In the step 1002, a sub-frame that contains additional signaling carrying ePDCCH position indication information is received from an base station device, and the ePDCCH position indication information is obtained from demodulation of the sub-frame, where the ePDCCH position indication information is adapted to indicate a position of the ePDCCH in a terminal device search space, and the additional signaling carrying ePDCCH position indication information is obtained on the basis of carrying the ePDCCH position indication information onto blank resource elements unused in a physical resource block pair (PRB-pair). Next in the step 1004, the ePDCCH is detected in the terminal device search space based on the ePDCCH position indication information obtained from demodulation. The method is ended in step 1006.

The method for detecting an ePDCCH according to the embodiment of the invention is a method corresponding to the terminal device adapted to detect an ePDCCH according to the embodiment of the invention, a detailed description thereof will not be repeated here.

Figure 11:
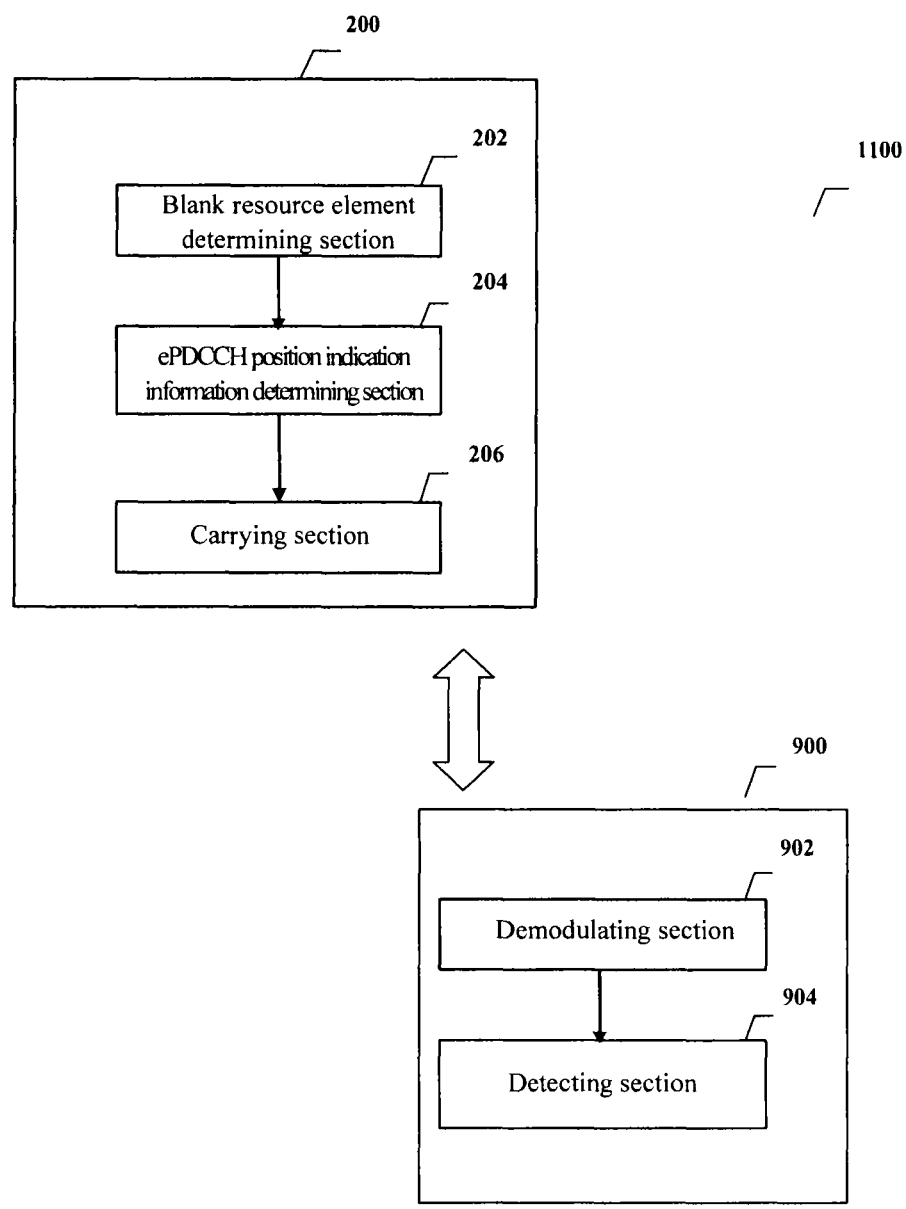
FIG. 11 illustrates a block diagram of a communication system according to an embodiment of the invention.

A communication system according to an embodiment of the invention will be described below with reference to FIG. 11. FIG. 11 illustrates a block diagram of a communication system according to an embodiment of the invention.

As illustrated in FIG. 11, the communication system 1100 includes an base station device 200 and a terminal device 900 communicating wirelessly with each other. The base station device 200 includes: a blank resource element determining section 202 adapted to determine, according to system configuration information of a communication system, blank resource elements unused in a physical resource block pair (PRB-pair); an ePDCCH position indication information determining section 204 adapted to determine, according to the system configuration information of the communication system, terminal device identifier information and channel quality information, ePDCCH position indication information for indicating a position of the ePDCCH in a terminal device search space; and a carrying section 206 adapted to carry the ePDCCH position indication information onto the blank resource elements so as to obtain a sub-frame that contains additional signaling carrying the ePDCCH position indication information, and transmitting the sub-frame to the terminal device. The terminal device 900 includes: a demodulating section 902 adapted to receive, from the base station device, the sub-frame that contains the additional signaling carrying the ePDCCH position indication information, and obtaining the ePDCCH position indication information from demodulation of the sub-frame, where the ePDCCH position indication information is adapted to indicate the position of the ePDCCH in the terminal device search space, and the additional signaling carrying the ePDCCH position indication information is obtained on the basis of carrying the ePDCCH position indication information onto the blank resource elements unused in the physical resource block pair (PRB-pair); and a detecting section 904 adapted to detect the ePDCCH in the terminal device search space based on the ePDCCH position indication information obtained from demodulation.

Evidently those ordinarily skilled in the art can make various modifications and variations to the embodiments of the invention without departing from the scope and the spirit of the invention. The embodiments have been selected and described for the purpose of better setting forth the principle and the real applications of the invention to enable those ordinarily skilled in the art to be aware of various possible embodiments of the invention with various changes as suited to their intended specific uses.

What is claimed is:

1. A base station device to configure an enhanced Physical Downlink Control Channel (ePDCCH), comprising:
   circuitry, configured to
   determine blank resource elements unused in a physical resource block pair (PRB-pair) using system configuration information of a communication system including the base station device, the system configuration information including a number of OFDM symbols carried in a Physical Downlink Control Channel (PDCCH) and a number of ports of a common reference signal;
   determine ePDCCH position indication information adapted to indicate a position of the ePDCCH in a terminal device search space of a terminal device in the communication system using the system configuration information, terminal device identifier information of the terminal device, and channel quality information, wherein ePDCCH comprises control information of the terminal device and is aggregated by a number of enhanced control channel elements, each enhanced control channel element consisting of a set of resource elements;
   generate a signaling comprising the ePDCCH position indication information for the terminal device;
   determine a number of resource elements per the PRB-pair based on the number of OFDM symbols carried in the PDCCH and the number of the ports of the common reference signal included in the system configuration information;
   determine a highest number of enhanced Control Channel Elements (eCCEs) carriable in the PRB-pair based on a number of resource elements in each eCCE and the determined number of the resource elements per the PRB-pair;
   determine a number of the blank resource elements based on the determined number of the resource elements per the PRB-pair, the number of resource elements in each eCCE, and the determined highest number of eCCEs carriable in the PRB-pair, by using the number of OFDM symbols carried in the PDCCH and the number of the ports of the common reference signal included in the system configuration information, by reducing, from the number of resource elements per the PRB-pair, the number of resource elements in each eCCE multiplied by the determined highest number of eCCEs carriable in the PRB-pair, the blank resource elements being resource elements, in the PRB pair, which have not been occupied by other signaling, data or pilots;
   determine whether to place the signaling into one or more continuous resource block pairs (PRB-pairs) in a localized mapping manner, or place the signaling into a plurality of resource block pairs (PRB-pairs) in a distributed mapping manner according to the determined number of the blank resource elements; and carry the signaling onto the determined blank resource elements by either placing the signaling into the one or more continuous resource block pairs (PRB-pairs) in the localized mapping manner, or placing the signaling into the plurality of resource block pairs (PRB-pairs) in the distributed mapping manner according to the determined number of the blank resource elements.

2. The base station device according to claim 1, wherein the ePDCCH position indication information comprises a start position of the ePDCCH in the terminal device search space which is determined based on an aggregation level of the terminal device search space.

3. The base station device according to claim 2, wherein the aggregation level is an integer multiple of the number of enhanced Control Channel Elements (eCCEs) contained in the physical resource block pair (PRB-pair).

4. The base station device according to claim 2, wherein the ePDCCH position indication information further comprises an offset of the ePDCCH in the terminal device search space.

5. The base station device according to claim 1, wherein the circuitry is further configured to carry the ePDCCH position indication information onto the blank resource elements so as to obtain a sub-frame that contains the signaling carrying the ePDCCH position indication information.

6. The base station device according to claim 5, wherein the circuitry adopts different lengths of bit codes for the signaling according to the number of the blank resource elements.

7. The base station device according to claim 5, wherein the circuitry performs mapping between the terminal device and the resource block pair (PRB-pair), according to terminal device identifier information, in any one of the following mapping manners: one terminal device corresponds to one resource block pair (PRB-pair), one terminal device corresponds to a plurality of resource block pairs (PRB-pairs), a plurality of terminal devices correspond to one resource block pair (PRB-pair), or a plurality of terminal devices correspond to a plurality of resource block pairs (PRB-pairs).

8. A method for configuring an enhanced Physical Downlink Control Channel (ePDCCH), comprising:

determining blank resource elements unused in a physical resource block pair (PRB-pair) using system configuration information of a communication system including the base station device, the system configuration information including a number of OFDM symbols carried in a Physical Downlink Control Channel (PDCCH) and a number of ports of a common reference signal;

determining, using circuitry, ePDCCH position indication information adapted to indicate a position of the ePDCCH in a terminal device search space of a terminal device in the communication system using the system configuration information, terminal device identifier information of the terminal device, and channel quality information, wherein ePDCCH comprises control information of the terminal device and is aggregated by a number of enhanced control channel elements, each enhanced control channel element consisting of a set of resource elements;

generating a signaling comprising the ePDCCH position indication information for the terminal device;

determining, using the circuitry, a number of resource elements per the PRB-pair based on the number of OFDM symbols carried in the PDCCH and the number of the ports of the common reference signal included in the system configuration information;

determining, using the circuitry, a highest number of enhanced Control Channel Elements (eCCEs) carriable in the PRB-pair based on a number of resource elements in each eCCE and the determined number of the resource elements per the PRB-pair;

determining a number of the blank resource elements based on the determined number of the resource elements per the PRB-pair, the number of resource elements in each eCCE, and the determined highest number of eCCEs carriable in the PRB-pair, by using the number of OFDM symbols carried in the PDCCH and the number of the ports of the common reference signal included in the system configuration information, by reducing, from the number of resource elements per the PRB-pair, the number of resource elements in each eCCE multiplied by the determined highest number of eCCEs carriable in the PRB-pair, the blank resource elements being resource elements, in the PRB pair, which have not been occupied by other signaling, data or pilots;

determining whether to place the signaling into one or more continuous resource block pairs (PRB-pairs) in a localized mapping manner, or place the signaling into a plurality of resource block pairs (PRB-pairs) in a distributed mapping manner according to the determined number of the blank resource elements; and carrying the signaling onto the determined blank resource elements by either placing the signaling into the one or more continuous resource block pairs (PRB-pairs) in the localized mapping manner, or placing the signaling into the plurality of resource block pairs (PRE-pairs) in the distributed mapping manner according to the determined number of the blank resource elements.

9. A terminal device to detect an enhanced Physical Downlink Control Channel (ePDCCH), comprising:

circuitry configured to determine a signaling, from a base station device, that contains ePDCCH position indication information indicating a position of the ePDCCH in a terminal device search space of the terminal device, the signaling being carried onto blank resource elements unused in a physical resource block pair (PRB-pair), the blank resource elements being determined by the base station device using system configuration information of a communication system including the terminal device and the base station device, the system configuration information including a number of OFDM symbols carried in a Physical Downlink Control Channel (PDCCH) and a number of ports of a common reference signal, the signaling being carried onto the blank resource elements by either placing the signaling into one or more continuous resource block pairs (PRB-pairs) in a localized mapping manner, or placing the signaling into a plurality of resource block pairs (PRB-pairs) in a distributed mapping manner according to a number of the blank resource elements determined by the base station, by determining a number of resource elements per the PRB-pair based on the number of OFDM symbols carried in the PDCCH and the number of the ports of the common reference signal included in the system configuration information, determining a highest number of enhanced Control Channel Elements (eCCEs) carriable in the PRB-pair based on a number of resource elements in each eCCE and the determined number of the resource elements per the PRB-pair, and by using the determined number of the resource elements per the PRB-pair, the number of resource elements in each eCCE, and the determined highest number of eCCEs carriable in the PRB-pair, by reducing, from the number of resource elements per the PRB-pair, the number of resource elements in each eCCE multiplied by the determined highest number of eCCEs carriable in the PRB-pair, based on the number of OFDM symbols carried in the PDCCH and the number of the ports of the common reference signal included in the system configuration information, the blank resource elements being resource elements, in the PRB pair, which have not been occupied by other signaling, data or pilots, by determining whether to place the signaling into the one or more continuous resource block pairs (PRB-pairs) in the localized mapping manner, or place the signaling into the plurality of resource block pairs (PRB-pairs) in the distributed mapping manner according to the determined number of the blank resource elements; and detect the ePDCCH in the terminal device search space based on the ePDCCH position indication information, wherein the ePDCCH position indication information is determined using the system configuration information, terminal device identifier information of the terminal device, and channel quality information by the base station device, and the ePDCCH comprises control information of the terminal device and is aggregated by a number of enhanced control channel elements, each enhanced control channel element consisting of a set of resource elements.

10. The terminal device according to claim 9, wherein the ePDCCH position indication information comprises a start position of the ePDCCH in the terminal device search space which is determined based on an aggregation level of the terminal device search space.

11. The terminal device according to claim 10, wherein the aggregation level is an integer multiple of the number of enhanced Control Channel Elements (eCCEs) contained in the physical resource block pair (PRB-pair).

12. The terminal device according to claim 10, wherein the ePDCCH position indication information further comprises an offset of the ePDCCH in the terminal device search space.

13. The terminal device according to claim 9, wherein
the circuitry determines, according to terminal device identifier information, the physical resource block pair (PRB-pair) in which the ePDCCH position indication information is placed.

14. The terminal device according to claim 13, wherein, when ePDCCH position indication information of a plurality of terminal devices exists in the same physical resource block pair (PRB-pair), descrambling is performed using the terminal device identifier information and a CRC check is performed, so as to distinguish, in the same physical resource block pair (PRB-pair), ePDCCH position indication information of the different terminal devices.

15. A method for detecting an enhanced Physical Downlink Control Channel (ePDCCH), comprising:
determining, using circuitry, a signaling, from a base station device, that contains ePDCCH position indication information indicating a position of the ePDCCH in a terminal device search space of the terminal device, the signaling being carried onto blank resource elements unused in a physical resource block pair (PRB-pair), the blank resource elements being determined by the base station device using system configuration information of a communication system including the terminal device and the base station device, the system configuration information including a number of OFDM symbols carried in a Physical Downlink Control Channel (PDCCH) and a number of ports of a common reference signal, the signaling being carried onto the blank resource elements by either placing the signaling into one or more continuous resource block pairs (PRB-pairs) in a localized mapping manner, or placing the signaling into a plurality of resource block pairs (PRB-pairs) in a distributed mapping manner according to a number of the blank resource elements determined by the base station, by determining a number of resource elements per the PRB-pair based on the number of OFDM symbols carried in the PDCCH and the number of the ports of the common reference signal included in the system configuration information, determining a highest number of enhanced Control Channel Elements (eCCEs) carriable in the PRB-pair based on a number of resource elements in each eCCE and the determined number of the resource elements per the PRB-pair, and by using the determined number of the resource elements per the PRB-pair, the number of resource elements in each eCCE, and the determined highest number of eCCEs carriable in the PRB-pair, by reducing, from the number of resource elements per the PRB-pair, the number of resource elements in each eCCE multiplied by the determined highest number of eCCEs carriable in the PRB-pair, based on the number of OFDM symbols carried in the PDCCH and the number of the ports of the common reference signal included in the system configuration information, the blank resource elements being resource elements, in the PRB pair, which have not been occupied by other signaling, data or pilots, by determining whether to place the signaling into the one or more continuous resource block pairs (PRB-pairs) in the localized mapping manner, or place the signaling into the plurality of resource block pairs (PRB-pairs) in the distributed mapping manner according to the determined number of the blank resource elements; and detecting the ePDCCH in the terminal device search space based on the ePDCCH position indication information, wherein the ePDCCH position indication information is determined using the system configuration information, terminal device identifier information of the terminal device, and channel quality information by the base station device, and the ePDCCH comprises control information of the terminal device and is aggregated by a number of enhanced control channel elements, each enhanced control channel element consisting of a set of resource elements.

16. A communication system, comprising:
a base station device; and
a terminal device, wherein
the base station device comprising:
first circuitry, configured to
determine blank resource elements unused in a physical resource block pair (PRB-pair) using system configuration information of a communication system including the base station device, the system configuration information including a number of OFDM symbols carried in a Physical Downlink Control Channel (PDCCH) and a number of ports of a common reference signal;

determine ePDCCH position indication information adapted to indicate a position of the ePDCCH in a terminal device search space of the terminal device in the communication system using the system configuration information, terminal device identifier information of the terminal device, and channel quality information, wherein ePDCCH comprises control information of the terminal device and is aggregated by a number of enhanced control channel elements, each enhanced control channel element consisting of a set of resource elements;

generate a signaling comprising the ePDCCH position indication information for the terminal device;

determine a number of resource elements per the PRB-pair based on the number of OFDM symbols carried in the PDCCH and the number of the ports of the common reference signal included in the system configuration information;

determine a highest number of enhanced Control Channel Elements (eCCEs) carriable in the PRB-pair based on a number of resource elements in each eCCE and the determined number of the resource elements per the PRB-pair;

determine a number of the blank resource elements based on the determined number of the resource elements per the PRB-pair, the number of resource elements in each eCCE, and the determined highest number of eCCEs carriable in the PRB-pair, by using the number of OFDM symbols carried in the PDCCH and the number of the ports of the common reference signal included in the system configuration information, by reducing, from the number of resource elements per the PRB-pair, the number of resource elements in each eCCE multiplied by the determined highest number of eCCEs carriable in the PRB-pair, the blank resource elements being resource elements, in the PRB pair, which have not been occupied by other signaling, data or pilots;

determine whether to place the signaling into one or more continuous resource block pairs (PRB-pairs) in a localized mapping manner, or place the signaling into a plurality of resource block pairs (PRB-pairs) in a distributed mapping manner according to the determined number of the blank resource elements; and carry the signaling onto the determined blank resource elements by either placing the signaling into the one or more continuous resource block pairs (PRB-pairs) in the localized mapping manner, or placing the signaling into the plurality of resource block pairs (PRB-pairs) in the distributed mapping manner according to the determined number of the blank resource elements, and the terminal device comprising:
second circuitry configured to
determine the signaling, from the base station device, that contains the ePDCCH position indication information, and
detect the ePDCCH in the terminal device search space based on the ePDCCH position indication information.

17. A non-transitory computer readable medium having instructions stored therein that when executed by processing circuitry perform a method for configuring an enhanced Physical Downlink Control Channel (ePDCCH), comprising:

determining blank resource elements unused in a physical resource block pair (PRB-pair) using system configuration information of a communication system including the base station device, the system configuration information including a number of OFDM symbols carried in a Physical Downlink Control Channel (PDCCH) and a number of ports of a common reference signal;

determining ePDCCH position indication information adapted to indicate a position of the ePDCCH in a terminal device search space of a terminal device in the communication system using the system configuration information, terminal device identifier information of the terminal device, and channel quality information, wherein ePDCCH comprises control information of the terminal device and is aggregated by a number of enhanced control channel elements, each enhanced control channel element consisting of a set of resource elements;

generating a signaling comprising the ePDCCH position indication information for the terminal device;

determining a number of resource elements per the PRB-pair based on the number of OFDM symbols carried in the PDCCH and the number of the ports of the common reference signal included in the system configuration information;

determining a highest number of enhanced Control Channel Elements (eCCEs) carriable in the PRB-pair based on a number of resource elements in each eCCE and the determined number of the resource elements per the PRB-pair;

determining a number of the blank resource elements based on the determined number of the resource elements per the PRB-pair, the number of resource elements in each eCCE, and the determined highest number of eCCEs carriable in the PRB-pair, by using the number of OFDM symbols carried in the PDCCH and the number of the ports of the common reference signal included in the system configuration information, by reducing, from the number of resource elements per the PRB-pair, the number of resource elements in each eCCE multiplied by the determined highest number of eCCEs carriable in the PRB-pair, the blank resource elements being resource elements, in the PRB pair, which have not been occupied by other signaling, data or pilots;

determining whether to place the signaling into one or more continuous resource block pairs (PRB-pairs) in a localized mapping manner, or place the signaling into a plurality of resource block pairs (PRB-pairs) in a distributed mapping manner according to the determined number of the blank resource elements; and carrying the signaling onto the determined blank resource elements by either placing the signaling into the one or more continuous resource block pairs (PRB-pairs) in the localized mapping manner, or placing the signaling into the plurality of resource block pairs (PRB-pairs) in the distributed mapping manner according to the determined number of the blank resource elements.

18. A non-transitory computer readable medium having instructions stored therein that when executed by processing circuitry perform a method for detecting an enhanced Physical Downlink Control Channel (ePDCCH), comprising:

determining a signaling, from a base station device, that contains ePDCCH position indication information indicating a position of the ePDCCH in a search space of the terminal device, the signaling being carried onto blank resource elements unused in a physical resource block pair (PRB-pair), the blank resource elements being determined by the base station device using system configuration information of a communication system including the terminal device and the base station device, the system configuration information including a number of OFDM symbols carried in a Physical Downlink Control Channel (PDCCH) and a number of ports of a common reference signal, the signaling being carried onto the blank resource elements by either placing the signaling into one or more continuous resource block pairs (PRB-pairs) in a localized mapping manner, or placing the signaling into a plurality of resource block pairs (PRB-pairs) in a distributed mapping manner according to a number of the blank resource elements determined by the base station, by determining a number of resource elements per the PRB-pair based on the number of OFDM symbols carried in the PDCCH and the number of the ports of the common reference signal included in the system configuration information, determining a highest number of enhanced Control Channel Elements (eCCEs) carriable in the PRB-pair based on a number of resource elements in each eCCE and the determined number of the resource elements per the PRB-pair, and by using the determined number of the resource elements per the PRB-pair, the number of resource elements in each eCCE, and the determined highest number of eCCEs carriable in the PRB-pair, by reducing, from the number of resource elements per the PRB-pair, the number of resource elements in each eCCE multiplied by the determined highest number of eCCEs carriable in the PRB-pair, based on the number of OFDM symbols carried in the PDCCH and the number of the ports of the common reference signal included in the system configuration information, the blank resource elements being resource elements, in the PRB pair, which have not been occupied by other signaling, data or pilots, by determining whether to place the signaling into the one or more continuous resource block pairs (PRB-pairs) in the localized mapping manner, or place the signaling into the plurality of resource block pairs (PRB-pairs) in the distributed mapping manner according to the determined number of the blank resource elements; and detecting the ePDCCH in the search space based on the ePDCCH position indication information, wherein the ePDCCH position indication information is determined using the system configuration information, terminal device identifier information of the terminal device, and channel quality information by the base station device, and the ePDCCB comprises control information of the terminal device and is aggregated by a number of enhanced control channel elements, each enhanced control channel element consisting of a set of resource elements.

19. The base station device according to claim 1, wherein the circuitry is configured to determine the ePDCCH position indication information based on configuration of Demodulation Reference Signal.

20. The base station device according to claim 1, wherein, in a case where the determined number of the blank resource elements is more than a number of resource elements required for the signaling, the circuitry is configured to place the signaling into a PRB-pair in the localized mapping manner.

21. The base station device according to claim 1, wherein the circuitry is configured to determine the number of resource elements per the PRB-pair, using a table stored in a memory, based on the number of OFDM symbols carried in the PDCCH and the number of the ports of the common reference signal included in the system configuration information.

* * * * *